(12) United States Patent
Ohara

(10) Patent No.: US 9,186,857 B2
(45) Date of Patent: Nov. 17, 2015

(54) TIRE MOLD, MANUFACTURING METHOD OF PNEUMATIC TIRE, AND PNEUMATIC TIRE

(75) Inventor: Masaaki Ohara, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 697 days.

(21) Appl. No.: 13/438,958

(22) Filed: Apr. 4, 2012

(65) Prior Publication Data

US 2012/0256349 A1 Oct. 11, 2012

(30) Foreign Application Priority Data

Apr. 5, 2011 (JP) ................................. 2011-083808

(51) Int. Cl.
*B29D 30/06* (2006.01)

(52) U.S. Cl.
CPC .... *B29D 30/0606* (2013.01); *B29D 2030/0617* (2013.01)

(58) Field of Classification Search
CPC .............................................. B29D 2030/0617
See application file for complete search history.

(56) References Cited

U.S. PATENT DOCUMENTS 7,290,996 B2 * 11/2007 Tanaka ............................ 425/46

FOREIGN PATENT DOCUMENTS

| JP | 4-12813 A | 1/1992 |
| JP | 6-143295 A | 5/1994 |
| JP | 2000-037728 A | 2/2000 |

OTHER PUBLICATIONS

Japanese Office Action dated Jul. 15, 2014, issued in corresponding Japanese Patent Application No. 2013-165355 with English translation (6 pages).
Decision of Refusal dated Feb. 6, 2015, issued in corresponding Japanese application No. 2013-165355, with English translation. (4 pages).

* cited by examiner

*Primary Examiner* — Alison Hindenlang
(74) *Attorney, Agent, or Firm* — Westerman, Hattori, Daniels & Adrian, LLP

(57) ABSTRACT

A tire mold has a tire molding surface. The tire molding surface is pressed against an outer surface of an uncured tire. A vent hole is provided in the tire molding surface. A surface of an outer edge region surrounding an opening of the vent hole is formed by a smooth surface. The smooth surface is smoother than a surface in a peripheral region of the outer edge region.

9 Claims, 5 Drawing Sheets (a) Rsk>0

(b) Rsk<0

(A)

(B)

TIRE MOLD, MANUFACTURING METHOD OF PNEUMATIC TIRE, AND PNEUMATIC TIRE

BACKGROUND OF THE INVENTION

1. Field of the Invention

The present invention relates to a tire mold in which a vent hole is provided in a tire molding surface which is pressed against an outer surface of an uncured tire, a manufacturing method of a pneumatic tire using the tire mold, and a pneumatic tire cured by using the tire mold.

2. Description of the Related Art

As disclosed in Japanese Unexamined Patent Publication No. 2000-37728, in a general tire mold which is used in a curing of a pneumatic tire, a lot of vent holes are provided in a tire molding surface which is pressed against an outer surface of an uncured tire, whereby air remaining between the tire molding surface and the uncured tire can be discharged out of the mold. If the discharge of the air is not appropriately carried out, a rubber short occurs in the tire molding surface due to the residual air, a deficit called a lightness (or a bare) is generated, and it may cause an appearance quality defect of the pneumatic tire.

Typically, the vent hole is set at a position at which the air tends to remain in the tire molding surface, and this position is also a position at which a reaching timing of the uncured rubber is comparatively late, however, it is impossible to arrange all the vent holes at the position mentioned above. Further, the vent holes are arranged on the assumption that the uncured rubber blocks the vent holes in such a stage that most of the air is discharged, however, the vent hole is blocked actually in such a stage that a certain degree of air has not yet discharged, and there is a case that the lightness is generated. Accordingly, the present inventor has considered that if the blocking timing of the vent hole can be further delayed, the generation of the lightness can be suppressed thereby.

Japanese Unexamined Patent Publication No. 6-143295 discloses a pneumatic tire in which a pattern portion having a predetermined surface roughness is formed in a bottom surface of a concave depression portion for forming a raised character of a side wall portion, and that a vent hole can be made unnecessary by the pattern portion. However, the technique is structured such as to decorate the raised character portion of the side wall portion like a grain woody texture or a mesh to the end, and cannot be applied to the other positions (for example, a tread surface) which do not require such a decoration, and a practical applicability is widely limited.

SUMMARY OF THE INVENTION

The present invention has been made in view of the above circumstances, and an object thereof is to provide a tire mold which can delay an blocking timing of a vent hole so as to suppress a generation of a lightness, a manufacturing method of a pneumatic tire which uses the tire mold, and a pneumatic tire which is cured by using the tire mold.

The object can be achieved by the following present invention. That is, the present invention provides a tire mold comprising a tire molding surface which is pressed against an outer surface of an uncured tire, and a vent hole which is provided in the tire molding surface, wherein a surface of an outer edge region which surrounds an opening of the vent hole is formed by a smooth surface which is smoother than a surface in a peripheral region of the outer edge region.

If the surface of the tire molding surface is smooth at a time when the outer surface of the uncured tire is pressed against the tire molding surface, the uncured rubber tends to be closely attached and there is a tendency that fluidity is lowered. On the contrary, if the surface of the tire molding surface is rough, there is a tendency that the uncured rubber does not stick fast and the fluidity is improved. The present invention utilizes a difference caused by the surface texture as mentioned above, and the uncured rubber tends to stick fast and the fluidity is lowered in the outer edge region which surrounds the opening of the vent hole, in comparison with the peripheral region thereof. Accordingly, it is possible to delay the blocking timing of the vent hole due to the uncured rubber, extend the time for which the air is discharged, and reduce the residual of the air so as to suppress the generation of the lightness.

In the tire mold in accordance with the present invention, it is preferable that a maximum height of roughness profile Rz of the smooth surface is equal to or less than 10 μm in the outer edge region, and an arithmetical mean deviation of roughness profile Ra of the surface is equal to or more than 1.0 μm in the peripheral region. By forming the surface in the outer edge region into the smooth surface in which the maximum height of roughness profile Rz is equal to or less than 10 μm, the contact area with the uncured rubber is secured, the viscosity resistance of the rubber is increased, and it is possible to appropriately delay the blocking timing of the vent hole. Further, by forming the surface in the peripheral region into a rough surface in which the arithmetical mean deviation of roughness profile Ra is equal to or more than 1.0 μm, the uncured rubber smoothly flows in the periphery of the outer edge region, and it is possible to well maintain the appearance quality of the pneumatic tire without adversely affecting the cure.

In the above, the surface texture of the outer edge region is specified by the maximum height of roughness profile Rz for the purpose of accurately generating the effect of enhancing the adhesion to the uncured rubber. In other words, in the case that this is specified by the arithmetical mean deviation of roughness profile Ra, even if a locally high peak is included in the smooth surface, it is averaged and there is a risk that a desired effect becomes small. Further, the surface texture of the peripheral region is specified by the arithmetical mean deviation of roughness profile Ra since it is necessary to maintain a uniformity of the surface roughness in the peripheral region in the light of an appearance quality of the pneumatic tire.

The maximum height of roughness profile Rz and the arithmetical mean deviation of roughness profile Ra respectively correspond to the maximum height of roughness profile Rz and the arithmetical mean deviation of roughness profile Ra defined in JISB0601:2001, and are based on the regulation. Further, rules and procedures for an assessment and characteristics of instruments are based on the provisions of JISB0633:2001 and JISB0651:2001. A sampling length and an evaluation length are defined in correspondence to a surface texture, and in the case where the maximum height of roughness profile Rz is equal to or less than 10 μm, the sampling length is 0.8 mm, the evaluation length is 4 mm, in the case where the maximum height of roughness profile Rz exceeds 10 μm and is equal to or less than 50 μm, the sampling length is 2.5 mm, the evaluation length is 12.5 mm, and in the case where the maximum height of roughness profile Rz exceeds 50 μm, the sampling length is 8 mm, the evaluation length is 40 mm.

In the tire mold in accordance with the present invention, it is preferable that a maximum height of roughness profile Rz of the surface is smaller in the outer edge region than in the peripheral region, and a difference thereof is equal to or more than 3 μm. With this structure, the adhesion of the uncured rubber with respect to the smooth surface is secured, in the outer edge region, and it is possible to improve an effect of suppressing the lightness.

In the tire mold in accordance with the present invention, it is preferable that the smooth surface has a circular portion having a diameter between 1.5 and 10 mm, and the opening of the vent hole is included in an inner portion of the circular portion. Since the diameter is equal to or more than 1.5 mm, it is possible to secure a region which the uncured rubber tends to stick fast to, and it is possible to delay the blocking time of the vent hole so as to improve the effect of suppressing the lightness. Further, since the diameter is equal to or less than 10 mm, it is possible to make the effect exerting to the appearance quality of the pneumatic tire small.

In the tire mold in accordance with the present invention, the smooth surface may have an extension portion which protrudes toward a projection for forming a groove portion provided in the tire molding surface. Since the air causing the lightness tends to remain in the vicinity of the projection (may be called a groove bone in some cases) for forming the groove portion, it is possible to prompt the discharge of the extra air so as to enhance the effect of suppressing the lightness with the smooth surface having the extension portion as mentioned above.

In the tire mold in accordance with the present invention, the smooth surface may be formed so as to come into contact with a projection for forming a groove portion provided in the tire molding surface or enter into the projection. Since the air causing the lightness tends to remain in the vicinity of the projection for forming the groove, it is possible to prompt the discharge of the extra air so as to enhance the effect of suppressing the lightness by forming the smooth surface so as to be in contact with the projection or enter into the projection.

Further, the present invention provides a tire mold comprising a tire molding surface which is pressed against an outer surface of an uncured tire, and a vent hole which is provided in the tire molding surface, wherein a tapered surface is formed in an opening of the vent hole, and the tapered surface is formed by a smooth surface which is smoother than a surface in a peripheral region which surrounds the tapered surface. With this structure, in comparison with the peripheral surface which surrounds the tapered surface, the uncured rubber tends to stick fast in the tapered surface of the vent hole, and the fluidity of the rubber is lowered. Accordingly, it is possible to delay the blocking timing of the vent hole, extend the time for which the air is discharged, and reduce the residual of the air so as to suppress the generation of the lightness.

Further, a manufacturing method of a pneumatic tire according to the present invention is provided with a step of cure the tire by using the tire mold mentioned above. In this method, it is possible to delay the blocking timing of the vent hole due to the uncured rubber, extend the time for which the air is discharged, and reduce the residual of the air so as to suppress the generation of the lightness, with the tire molding surface in which the smooth surface as mentioned above is formed.

Further, a pneumatic tire according to the present invention is structured such as to be cured by using the tire mold as mentioned above. Since the pneumatic tire is structured such that the generation of the lightness is suppressed, by the tire mold having the tire molding surface in which the smooth surface as mentioned above is formed, it is excellent in an appearance quality.

DETAILED DESCRIPTION OF THE PREFERRED EMBODIMENTS

Figure 1:
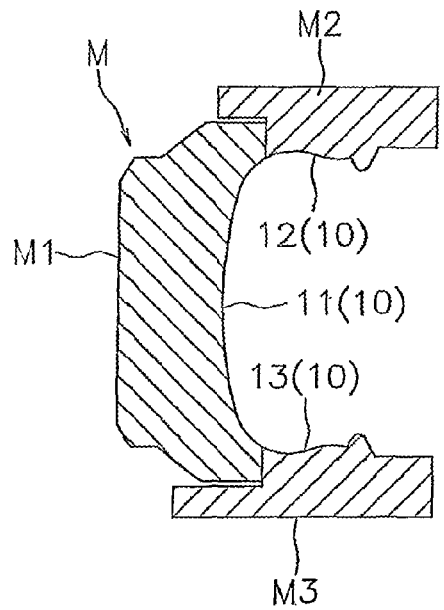
FIG. 1 is a vertical cross sectional view schematically showing an example of a tire mold according to the present invention.

An embodiment of the present invention will be explained with reference to the drawings. FIG. 1 shows a schematic cross sectional view of a tire mold M (hereinafter, referred to as mold M) as a cure metal mold for a tire. At the time of the cure molding, the uncured tire is set to the mold M by setting the tire axial direction to up and down, and the outer surface of the uncured tire is brought into contact with the tire molding surface 10. The mold M is provided with a tread mold portion M1 for molding the tread portion, and side mold portions M2 and M3 for molding the side wall portions, and the tire molding surface 10 is constructed by inner surfaces 11 to 13 of the respective mold portions.

Figure 2:
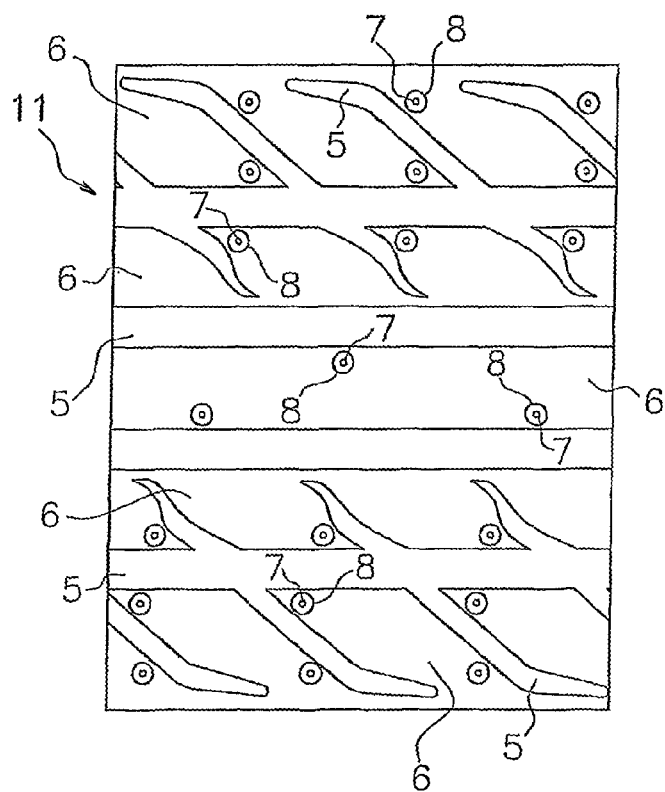
FIG. 2 is an expansion plan view showing an example of a tire molding surface.

As shown in FIG. 2, the inner peripheral surface 11 of the tread mold portion M1 is provided with a projection 5 for forming a groove portion, and a depression 6 for forming a land portion which is partitioned by the projection 5. Specifically, the inner peripheral surface 11 is provided with the projection 5 for forming four main grooves which extend in a tire circumferential direction (a lateral direction of FIG. 2) and a lateral groove which intersects them, and the depression 6 which is partitioned by the projection 5 and is provided for forming ribs and blocks. A tread pattern corresponding to the concavo-convex shape is formed in the tread portion of the cured pneumatic tire.

Figure 3:
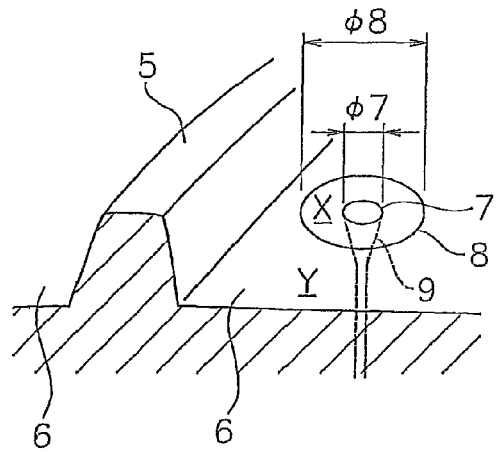
FIG. 3 is a perspective view showing a substantial part of the tire molding surface in an enlarged manner.

A lot of vent holes 7 which are communicated with an outer portion of the mold M are provided in the inner peripheral surface 11 which corresponds to the tire molding surface 10. The vent hole 7 is open in a bottom surface of the depression 6 as shown in FIG. 3, and a diameter φ7 of the opening in the tire molding surface side is, for example, between 0.4 and 2.5 mm. In this mold M, a surface of an outer edge region X which surrounds the opening of the vent hole 7 is formed by a smooth surface 8 which is smoother than a surface of a peripheral region Y of the outer edge region X. In other words, the outer edge region X is relatively smooth with regard to the surface roughness of the tire molding surface 10, and the peripheral region Y which surrounds the outer edge region X is relatively rough.

As mentioned above, since the outer edge region X is smooth in its surface in comparison with the peripheral region Y which is adjacent thereto, the uncured rubber tends to stick fast in the outer edge region X in comparison with the peripheral region Y due to a difference in a surface texture, a received heat from the mold M is relatively increased in the outer edge region X in comparison with the peripheral region Y, the uncured rubber, particularly a surface layer portion which comes into contact with the tire molding surface 10 is prompted its cure so as to harden, and there is a tendency that fluidity is lowered. Accordingly, at the time of the cure molding, it is possible to delay an blocking timing of the vent hole 7 due to the uncured rubber, extend a time for which the air is discharged, and reduce a residual of an air so as to suppress a generation of a lightness.

The smooth surface 8 may be smoother than the surface of the peripheral region Y by being compared in a maximum height of roughness profile Rz, that is, the maximum height of roughness profile Rz may be smaller than the surface of the peripheral region Y, whereby it is possible to obtain the effect of suppressing the lightness mentioned above. This relationship is defined by the maximum height of roughness profile Rz for avoiding such a matter that the smooth surface includes a locally high peak, securing an actual heat receiving area by enhancing an adhesion between the uncured rubber and the tire molding surface 10, and prompting the cure of the surface layer portion of the uncured rubber so as to accurately generate an action of reducing the fluidity. In an early stage of the cure process, a relative position between the tire molding surface 10 and the surface layer of the uncured tire is gradually changed due to the pressing pressure which acts on the uncured tire from an inner side, and the uncured rubber is filled in the depression 6. However, since the cure of the surface layer portion of the uncured rubber is prompted, it does not stick fast early based on an elastic effect which is enhanced by the cure of the surface layer portion even if it is laid over the vent hole 7, and it is possible to secure a micro gap which can be airway.

On the other hand, in the case that the smooth surface includes the locally high peak, the uncured rubber is pressed by the high peak, a point contact or a line contact is generated with respect to the tire molding surface 10 based on a mechanical property which the uncured rubber has, and a surface contact is hard to be generated. Accordingly, the cure of the surface layer portion of the uncured rubber is not promoted, it is pressed into the vent hole 7 due to a low elasticity at a time when it is laid over the vent hole 7, and an air discharge function is easily lost. Based on the technical reasons mentioned above, in order to secure a desired effect, it is preferable that at least the smooth surface 8 is smoother than the surface of the peripheral region Y by being compared in both of the maximum height of roughness profile Rz and the arithmetical mean deviation of roughness profile Ra.

The maximum height of roughness profile Rz of the smooth surface 8 is preferably equal to or less than 10 μm in the outer edge region X, and more preferably equal to or less than 5 μm. If this goes beyond 10 μm, the adhesion of the uncured rubber with respect to the smooth surface 8 is lowered, and the effect of delaying the blocking timing of the vent hole 7 (a lost timing of the air discharge function) becomes smaller by an increase of an elastic modulus going with a cure progress of the surface layer portion. On the other hand, in the peripheral region Y, the arithmetical mean deviation of roughness profile Ra of the surface is preferably equal to or more than 1.0 μm, and more preferably equal to or more than 1.5 μm. If this goes below 1.0 μm, it takes a long time for the uncured rubber to go around the tire molding surface 10, and the cure of the surface layer portion is excessively prompted, whereby it becomes further hard to fill the uncured rubber in a region which is relatively hard to be filled with the rubber such as a sharp corner portion or the like, and there is a risk that an appearance quality of the pneumatic tire is deteriorated by a generation of a rubber short filling.

As mentioned above, it is important to suppress the cure progress of the surface layer portion of the uncured rubber in the peripheral region Y, and promote the cure progress of the surface layer portion of the uncured rubber in the outer edge region X. Further, in order to obtain the uniformity of the appearance quality of the pneumatic tire as a whole, it is necessary to evaluate of a mean roughness of an evaluation surface rather than a local irregularity evaluation. The arithmetical mean deviation of roughness profile Ra in the tire molding surface 10 including the peripheral region Y is set to be equal to or less than 5.0 μm at the most.

It is preferable that the maximum height of roughness profile Rz of the surface is smaller in the outer edge region X than in the peripheral region Y, and a difference therebetween is equal to or more than 3 μm. By securing the difference of the surface roughness as mentioned above, it is possible to secure the adhesion of the uncured rubber with respect to the smooth surface 8, and it is possible to improve the effect of suppressing the lightness, in the outer edge region X.

Figure 4:
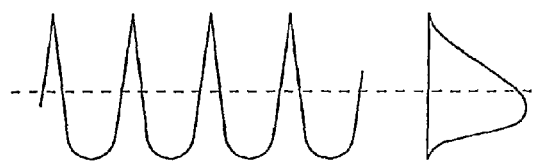
FIGS. 4(a) and 4(b) are a diagram for explaining a skewness of roughness profile Rsk.
Figure 4:
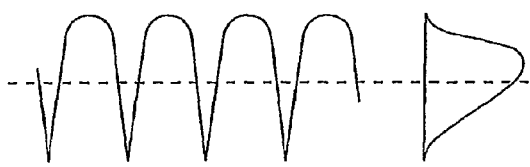

It is preferable that a skewness of roughness profile Rsk of the smooth surface 8 comes to Rsk <0 in the outer edge region X. As shown in FIGS. 4(*a*) and 4(*b*), the skewness of roughness profile Rsk expresses a degree of bias (a measure of asymmetry postulate of a height amplitude curve), and if the skewness of roughness profile Rsk is a negative value (Rsk <0), a peak of roughness profile becomes comparatively gentle. According to the smooth surface 8 mentioned above, a contact area with the uncured rubber can be secured, and it is possible to enhance an elasticity of the surface layer portion as well as promoting the cure of the surface layer portion of the uncured rubber so as to lower the fluidity, whereby it is possible to appropriately delay the losing timing of the air discharge function due to blocking the vent hole 7, and it is possible to improve the effect of suppressing the lightness. FIGS. 4(*a*) and 4(*b*) are schematically expressed, and an actual roughness profile becomes such an uneven shape that a height is irregular.

Regarding the above matter, the skewness of roughness profile Rsk correspond to the skewness of roughness profile Rsk of roughness profile defined in JISB0601:2001, and are based on the regulation. Further, rules and procedures for an assessment and characteristics of instruments are based on the provisions of JISB0633:2001 and JISB0651:2001. A sampling length and an evaluation length are defined in correspondence to a surface texture, and the classification is described above.

The shape of the smooth surface 8 is not particularly limited as long as it surrounds the opening of the vent hole 7, but may be a polygonal shape, however, it is preferable that the smooth surface 8 has a circular portion as in the present embodiment, and the opening of the vent hole 7 is included in the inner portion of the circular portion, in the light of securing the region which the uncured rubber tends to stick fast to in the periphery of the opening of the vent hole 7. A diameter φ8 of the circular portion is preferable between 1.5 and 10 mm, and more preferably between 2 and 3 mm. In the case that the smooth surface 8 has a polygonal shape, a size is defined by a circle which inscribes it.

Further, it is possible to suppress a rapid change of the surface roughness between the peripheral region Y and the smooth surface 8 by gradually reducing the maximum height of roughness profile Rz of the smooth surface 8 from the peripheral region Y toward the opening of the vent hole 7, whereby it is possible to obtain a more natural tire appearance. In this case, it is practical to partition the smooth surface 8 concentrically into a plurality of annular regions and differentiate the maximum height of roughness profile Rz thereof. Further, in order to achieve a uniformity of the appearance quality of the pneumatic tire, it is preferable to be smaller toward the closer side to the vent hole 7 not only in the maximum height of roughness profile Rz, but also in the arithmetical mean deviation of roughness profile Ra.

As an aspect of the above, for example, there can be considered a structure in which the smooth surface 8 surrounding the opening of the vent hole having a diameter of 0.6 mm is partitioned into a plurality of concentric circular regions including an inner region having a diameter of 5 mm or less, and an outer region having a diameter of 10 mm or less and except the inner region, based on a center of the vent hole, and the maximum height of roughness profile Rz is set to be equal to or less than 5 μm in the inner region, to be equal to or less than 10 μm in the outer region and to be about 15 μm in the peripheral region. Accordingly, since it is possible to suppress the rapid change of the surface roughness so as to suppress a brightness difference generated in the pneumatic tire, it is possible to improve a quality in a tire appearance.

Figure 5:
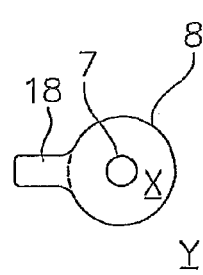
FIGS. 5(A) and 5(B) are plan views exemplifying another shape of a smooth surface.
Figure 5:
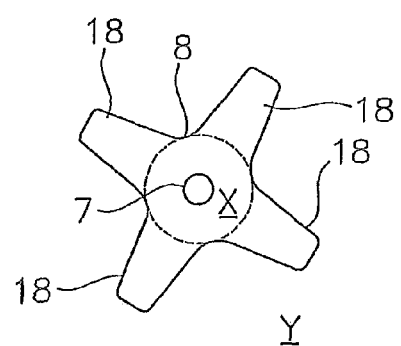

The smooth surface 8 may have such a shape as exemplified in FIGS. 5(A) and 5(B). The smooth surfaces 8 shown in FIGS. 5(A) and 5(B) both have a circular portion including an opening of the vent hole 7, and are provided respectively with one and four extension portions 18. According to this shape, it is easy to gain time until the uncured rubber reaches the vent hole 7 along a direction in which the extension portion 18 extends, and it is possible to effectively utilize for elongating the time for which the air is discharged.

Figure 6:
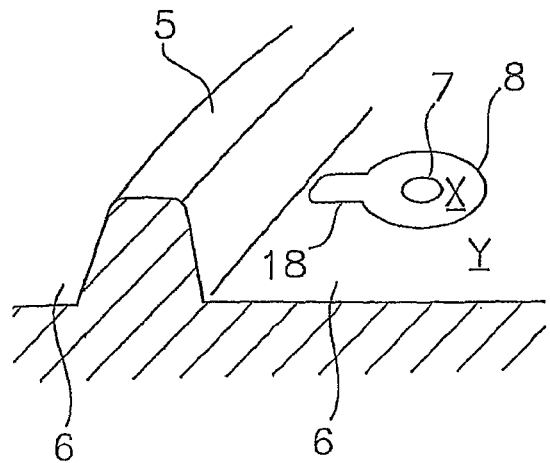
FIG. 6 is a perspective view showing a smooth surface having an extension portion.

FIG. 6 is an example in which the smooth surface 8 has an extension portion 18 which protrudes toward the projection 5, and a planar shape thereof is as shown in FIG. 5(A). Since the air causing the lightness tends to remain in the vicinity of the projection 5, particularly in the vicinity of a ridge line between a side surface of the projection 5 and a bottom surface of the depression 6, it is easy to maintain a discharge route of the air from a position at which the air tends to remain up to the vent hole 7, by the smooth surface 8 having the extension portion 18 like this. Accordingly, it is possible to promote a discharge of an extra air, and it is possible to enhance the effect of suppressing the lightness.

Figure 7:
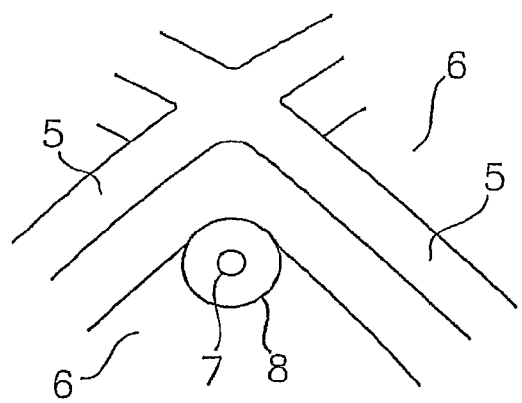
FIG. 7 is a perspective view showing an example of arrangement of the smooth surface.
Figure 8:
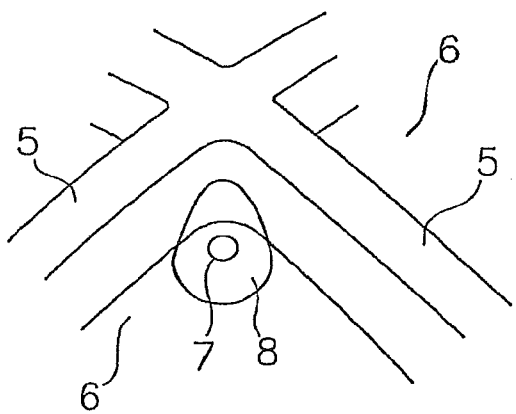
FIG. 8 is a perspective view showing an example of arrangement of the smooth surface.

In the vent hole 7 which is arranged in the vicinity of the projection 5, the smooth surface 8 may be formed so as to come into contact with the projection 5 as shown in FIG. 7, or the smooth surface 8 may be formed so as to enter into the projection 5 as shown in FIG. 8. Accordingly, it is possible to promote the discharge of the extra air which tends to remain, so as to enhance the effect of suppressing the lightness. In the smooth surface 8 having the extension portion 18, the extension portion 18 may be brought into contact with the projection 5 or may be entered thereto. At the time of employing the arrangement of the smooth surface 8 like this, an intersecting position of the projections 5 is drawn in FIGS. 7 and 8, however, the structure is not limited to this.

In the surface of the outer edge region X corresponding to the smooth surface 8, and the surface of the peripheral region Y, a working method and a working condition are not particularly limited, as long as the surface texture mentioned above can be obtained. As the working method, there are exemplified a blast process which sprays a sand or an abrasive material, and an etching process which sprays an etching solution, and there can be considered a grinding lightly by a sand paper or the like in addition thereto. At this time, it is possible to form a smooth surface having desired shape and size by applying a masking to the surface of the outer edge region X or the peripheral region Y.

Figure 9:
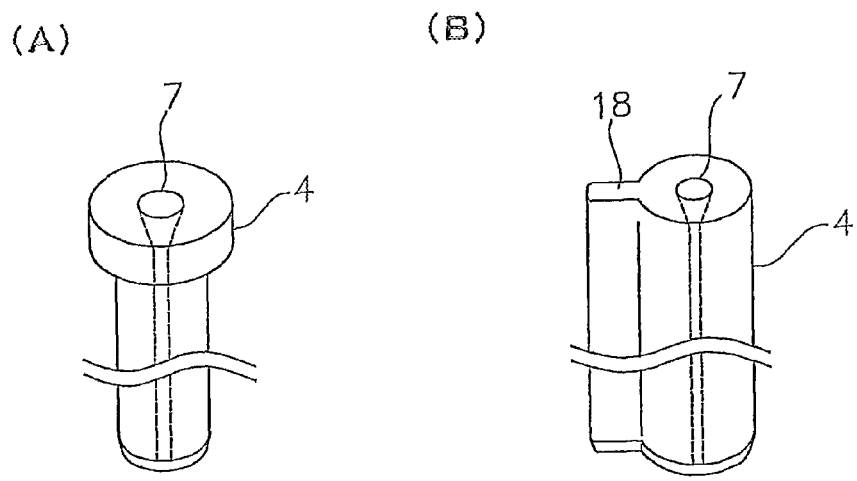
FIGS. 9 (A) and 9 (B) are perspective views of a vent piece.

The vent hole 7 shown in FIG. 3 is provided by directly piercing the tire molding surface 10, however, is not limited to this, but may utilize a vent piece 4 as exemplified in FIGS. 9(A) and 9(B). The vent piece 4 is a tubular plug which is fitted into the tire molding surface 10, and a hole in an inner portion serves as the vent hole 7. In this case, it is possible to simply form the smooth surface 8 by relatively smoothening a top surface of the vent piece 4. The smooth surface 8 may be formed by using only a part of the top surface of the vent piece 4 or using the top surface of the vent piece 4 and a protruding portion therefrom.

FIG. 9(B) is a vent piece 4 in the case that the smooth surface 8 has an extension portion 18. Even in the vent piece 4 shown in FIG. 9(A), the extension portion 18 can be formed by a masking at the time of a surface processing as mentioned above. Further, even in the arrangement shown in FIGS. 7 and 8, it is possible to utilize the vent piece 4, and in the case that the smooth surface 8 in FIG. 8 is constructed by the top surface of the vent piece 4, the vent piece 4 constructs a part of the projection 5. Even in the case of having the extension portion 18 as shown in FIGS. 5(A) and 5(B), it is possible to prepare a vent piece having a complicated shape without any particular limitation, by using a manufacturing method such as a powder sintering.

In cleaning of the mold M, a shot blast or the like is generally applied to the tire molding surface 10, however, if smoothness of the outer edge region X is deteriorated thereby, it is in bad condition at the time of using thereafter. Accordingly, it is useful to differentiate the material between the outer edge region X and the peripheral region Y and relatively enhance a hardness of the smooth surface 8, whereby it is possible to reduce a surface damage of the smooth surface 8 so as to maintain smoothness and secure an effect of suppressing the lightness.

For example, there can be considered that a hardening treatment such as a heat hardening treatment or a tafftrided treatment is applied to the surface of the outer edge region X which corresponds to the smooth surface 8. In the case of using the vent piece 4, the hardening treatment mentioned above may be applied to the surface including the top surface. Alternatively, there can be considered that the tire molding surface 10 including the peripheral region Y is made of an aluminum cast (AC4D, AC7A or the like), and the vent piece 4 constructing the smooth surface 8 is made of a harder material, for example, stainless steel (SUS303, SUS304 or the like) or carbon steel (S45C or the like).

In the case that the tapered surface 9 is formed in the opening of the vent hole 7 as shown in FIG. 3, a circumferential length of the opening becomes larger because of a relative enlargement of an opening diameter, and a ventilation through a micro gap which is formed between the uncured rubber in which the surface layer portion is cured and the outer edge region X is effectively maintained. Further, it is preferable to make not only the smooth surface 8 but also the tapered surface 9 smoother than the surface of the peripheral region Y, whereby it is possible to enhance an effect of delaying the blocking timing of the vent hole 7.

Further, there can be obtained an effect of suppressing a cutting of a spew (a rubber projection) which is formed by a rubber flowing into the vent hole 7, at the time of picking up the cured tire from the mold M, by forming the tapered surface 9 which is expanded toward the opening as mentioned above smooth. This is an effect obtained by such a matter that the fluidity of the uncured rubber in which the surface layer portion is cured is lowered and an inflow amount to the vent hole 7 is reduced, whereby it is possible to prevent the spew from becoming long, as well as preventing the micro concave portion transferred to the spew from being formed.

The tire mold according to the present invention may be structured such that the tapered surface 9 as mentioned above is formed by a smooth surface which is smoother than a peripheral surface which surrounds the tapered surface 9. Even if the surface of the outer edge region X has the same nature as that of the peripheral one, it is possible to obtain the effect of delaying the blocking timing of the vent hole 7 as long as the tapered surface 9 is smooth. Therefore, it is possible to suppress the generation of the lightness by elongating the time for which the air is discharged. The matters described with regard to the surface texture of the smooth surface 8 such as the preferable ranges of the maximum height of roughness profile Rz and the skewness of roughness profile Rsk are applicable to the tapered surface 9.

Figure 10:
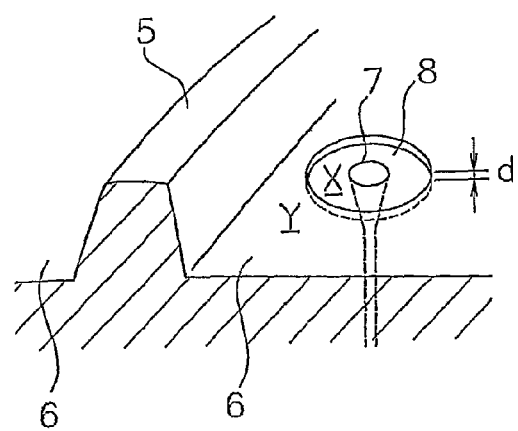
FIG. 10 is a perspective view showing a modified example of the smooth surface.

In an example shown in FIG. 10, the surface of the outer edge region X which corresponds to the smooth surface 8 is formed concave. It is possible to elongate the time until the uncured rubber reaches the vent hole 7 so as to enhance the effect of promoting the air discharge, by sinking the surface of the outer edge region X like this, in cooperation with the formation of the surface by the smooth surface 8. A depth d at which the outer edge region X is sunk is set, for example, to 0.05 to 3 mm.

The smooth surface 8 can be provided in inner peripheral surfaces 12 and 13 of side mold portions M2 and M3, without being limited to the inner peripheral surface 11 of the tread mold portion M1, and may be provided in all the regions of the tire molding surface 10 including them. Even in the case that a knurling pattern is formed in the inner peripheral surfaces 12 and 13 of the side mold portions M2 and M3, the smooth surface 8 can be formed in the periphery of the vent hole 7 which is provided therein. The knurling pattern like this is, for example, between 200 and 300 μm in its concavo-convex height, however, this does not directly come to a surface roughness of the peripheral region as defined in the above listed JIS.

Next, a description will be given of a manufacturing method of a pneumatic tire by using the mold M. Since it can be carried out in the same manner as the conventional tire manufacturing steps except a step of curing the tire, a description will be given only of the curing step. The manufacturing method of the pneumatic tire has a step of curing the tire by using the mold M mentioned above.

Figure 11:
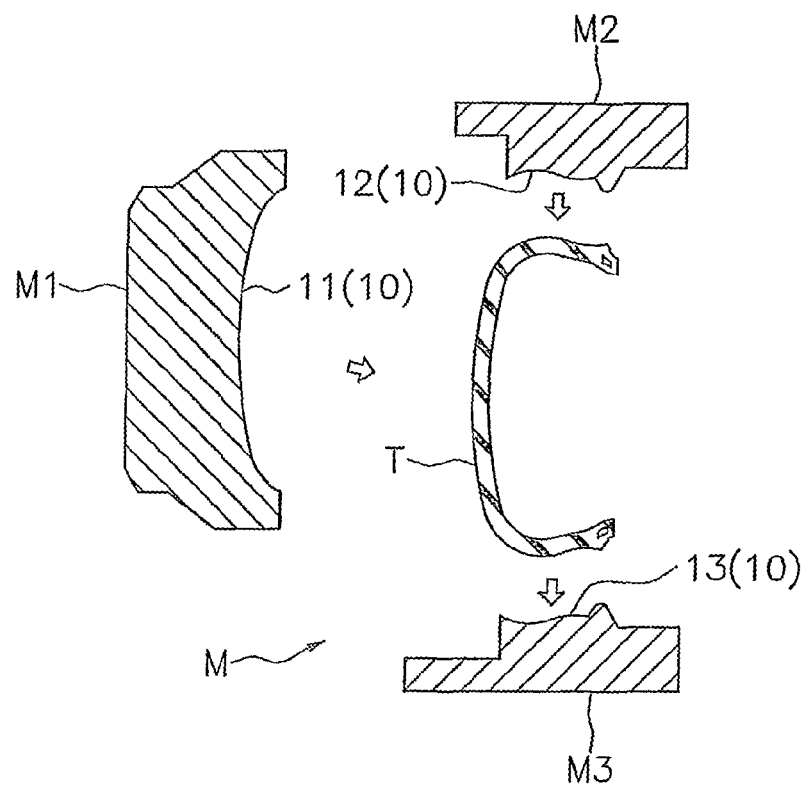
FIG. 11 is a cross sectional view explaining a setting of an uncured tire to the tire mold.

In the curing step, the uncured tire T before the cure is set as shown in FIG. 11, the tire molding surface 10 is thereafter pressed against the outer surface of the tire by clamping the mold M as shown in FIG. 1, and heat and pressure are applied to the tire T. At this time, the fluidity of the rubber lowers in the periphery of the vent hole 7, and it is possible to delay the blocking timing of the vent hole 7 due to the uncured rubber, with the tire molding surface 10 in which the smooth surface 8 as mentioned above is formed. Accordingly, it is possible to extend a time for which the air is discharged, and reduce a residual of an air so as to suppress a generation of a lightness.

The present invention is not limited to the embodiment mentioned above, but can be variously modified and changed within the scope of the present invention. In the embodiment mentioned above, there is shown the example in which the tire molding surface is constructed by three mold portions, however, the structure is not limited thereto, and it may be constructed, for example, by a pair of mold portions which are divided into two sections in the center of the tread portion. Further, an inner side in the tire diametrical direction of the side mold portion may be provided with a bead ring fitting the bead portion of the tire as an independent member.

EXAMPLE

In order to specifically show the structure and the effect of the present invention, a cure was carried out by using a mold for molding a tire having a tire size of 11R22.5 and having five ribs pattern, and a generation condition of a lightness was evaluated. In the evaluation, one hundred cured tires were observed, a product tire in which the lightness was recognized and a commercial value was determined to be lost was set to X, a product tire in which the lightness was recognized, however, the commercial value was determined not to be lost was set to Δ, and a product tire in which the lightness was not recognized was set to ○. Under a state in which a shape unclear region is provided in any of ridge lines of the rib, a radius of curvature being equal to or less than 1 mm was determined to Δ, and a radius of curvature being more than 1 mm was determined to X.

A groove which partitions each of the ribs was formed as a linear groove which extends in parallel to a tire equator surface, a groove dept of each of them was 15 mm, and a groove width was 15 mm. A tread width was 220 mm. Totally thirty vent holes were arranged per 110 mm along a tire circumferential direction, at a position which is 6 mm in a tread width direction from a projection for forming the groove portion toward a center side of the rib. Further, thirty vent holes were arranged per 110 mm in the tire circumferential direction while having a phase displacement of 55 mm in the tire circumferential direction with respect to the thirty vent holes within the depression in which the same ribs are formed, and consequently totally three hundred vent holes were arranged in the tread surface.

A comparative example was set to a structure in which the surface texture is the same in the outer edge region and the peripheral region. Further, an example 1 was set to a structure in which the surface of the outer edge region is formed by the smooth surface as mentioned above, in the inner peripheral surface of the tread mold portion. Further, an example 2 was set to a structure in which the smooth surface has an extension portion protruding toward the projection for forming the groove portion, in the example 1. A diameter $\phi 7$ of the vent hole was set to 0.6 mm, and the smooth surface was formed into a circular shape in which a diameter $\phi 8$ is 4 mm.

TABLE 1

| | Outer edge region | Peripheral region | | Generating condition of lightness | | |
|---|---|---|---|---|---|---|
| | Rz (μm) | Rz (μm) | Ra (μm) | | | |
| Comparative example | 17.24 | 16.73 | 2.23 | X 5% | Δ 28% | ○ 67% |
| Example 1 | 8.67 | 16.82 | 2.42 | | Δ 9% | ○ 91% |
| Example 2 | 9.86 | 13.81 | 1.97 | | | ○ 100% |

As shown in Table 1, in the conventional structure, the uncured rubber blocks the vent hole in a state before a certain degree of air is not discharged, and there is a case that the lightness is generated (the comparative example). On the contrary, in the case that the surface of the outer edge region is formed by the smooth surface, it is possible to reduce the remaining of the air so as to prevent the generation of the lightness (the examples 1 and 2).

What is claimed is:

1. A tire mold comprising:
a tire molding surface which is pressed against an outer surface of an uncured tire; and
a vent hole which is provided in the tire molding surface, wherein a surface of an outer edge region which surrounds an opening of the vent hole is formed by a smooth surface which is smoother than a surface in a peripheral region of the outer edge region.

2. The tire mold according to claim 1, wherein a maximum height of roughness profile Rz of the smooth surface is equal to or less than 10 μm in the outer edge region, and an arithmetical mean deviation of roughness profile Ra of the surface is equal to or more than 1.0 μm in the peripheral region.

3. The tire mold according to claim 2, wherein a maximum height of roughness profile Rz of the surface is smaller in the outer edge region than in the peripheral region, and a difference thereof is equal to or more than 3 μm.

4. The tire mold according to claim 3, wherein the smooth surface has a circular portion having a diameter between 1.5 and 10 mm, and the opening of the vent hole is included in an inner portion of the circular portion.

5. The tire mold according to claim 1, wherein a maximum height of roughness profile Rz of the surface is smaller in the outer edge region than in the peripheral region, and a difference thereof is equal to or more than 3 μm.

6. The tire mold according to claim 1, wherein the smooth surface has a circular portion having a diameter between 1.5 and 10 mm, and the opening of the vent hole is included in an inner portion of the circular portion.

7. The tire mold according to claim 1, wherein the smooth surface has an extension portion which protrudes toward a projection for forming a groove portion provided in the tire molding surface.

8. The tire mold according to claim 1, wherein the smooth surface is formed so as to come into contact with a projection for forming a groove portion provided in the tire molding surface or enter into the projection.

9. A tire mold comprising:
a tire molding surface which is pressed against an outer surface of an uncured tire; and
a vent hole which is provided in the tire molding surface, wherein a tapered surface is formed in an opening of the vent hole, and the tapered surface is formed by a smooth surface which is smoother than a surface in a peripheral region which surrounds the tapered surface.

* * * * *